2 Sheets—Sheet 1.

C. S. RANKIN.

FIRE-PLACE.

No. 7,787. Reissued July 10, 1877.

Attest.
Chas. J. Cooch
L. Blond Burdett

Chas. S. Rankin
By Octavius Knight
Atty

N. PETERS, PHOTO-LITHOGRAPHER, WASHINGTON, D. C.

C. S. RANKIN.

FIRE-PLACE.

No. 7,787. Reissued July 10, 1877.

Attest.
Chas J. Good
L. Blond Burdett

Chas. S. Rankin
By Octavius Knight Atty

N. PETERS, PHOTO-LITHOGRAPHER, WASHINGTON, D. C.

UNITED STATES PATENT OFFICE.

CHARLES S. RANKIN, OF CINCINNATI, OHIO.

IMPROVEMENT IN FIRE-PLACES.

Specification forming part of Letters Patent No. 88,509, dated March 30, 1869; Reissue No. 7,787, dated July 10, 1877; application filed November 2, 1876.

*To all whom it may concern:*

Be it known that I, CHARLES S. RANKIN, of Cincinnati, in the county of Hamilton and State of Ohio, have invented certain new and useful Improvements in Fire-Places, of which the following is a specification:

It is a well-known fact that where open-front fire-places are employed a greater or less escape of gas, smoke, dust, &c., takes place at the ends of the basket or grate, which nuisance is occasioned by the comparatively feeble draft at the ends of the basket.

In order to overcome this serious objection to the use of open-front fire-places, also to adapt the fire-place to receive a summer front without the removal of the grate proper or basket, I arrange the jambs of the fire-place in such a manner with reference to the outwardly-projecting or convex basket or grate as to afford a vertical channel or passage at each side or end of the said basket, which vertical channels communicate above with the main flue, through which the products of combustion escape from the grate. These two vertical channels, being located at the junction of the basket sides or ends with the respective jambs, act to produce a cross-radiation and a strong draft, which conveys directly up to the main flue any smoke, dust, or gas that would otherwise escape out into the room. This strong draft also insures an active combustion of fuel at the sides or ends of the grate, thereby keeping up a clean fire and adding materially to the cheerfulness of the open-front fire-place.

Figure 1:
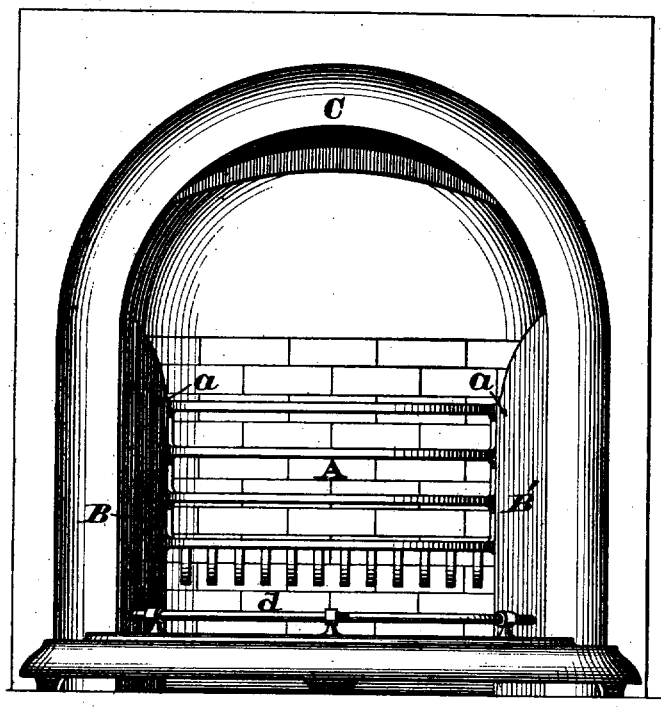
Figure 2:
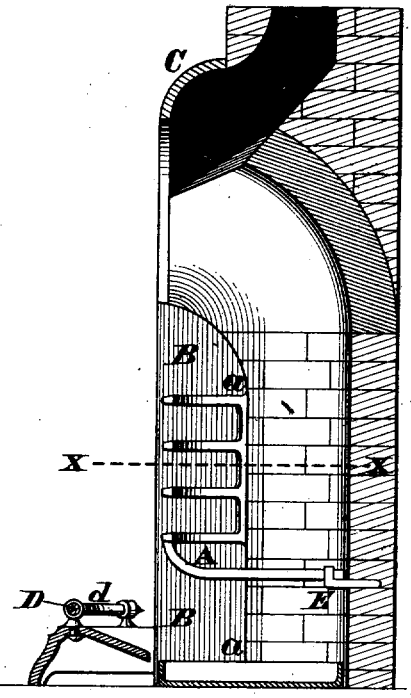
Figure 3:
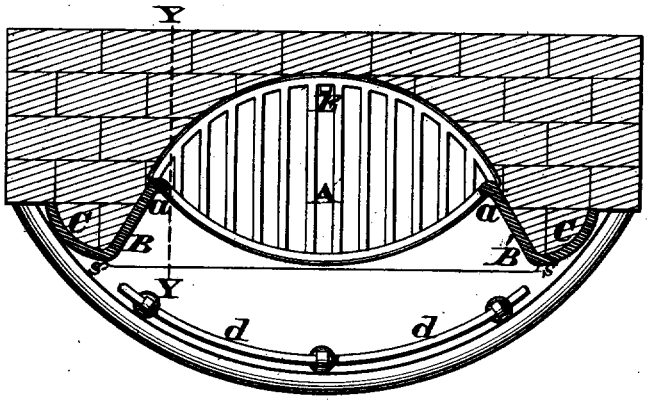
Figure 4:
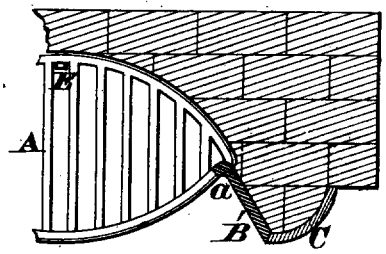
Figure 5:
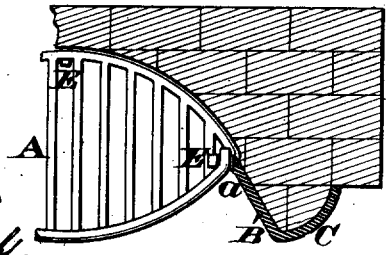
Figure 6:
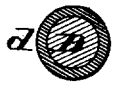
Figure 4:
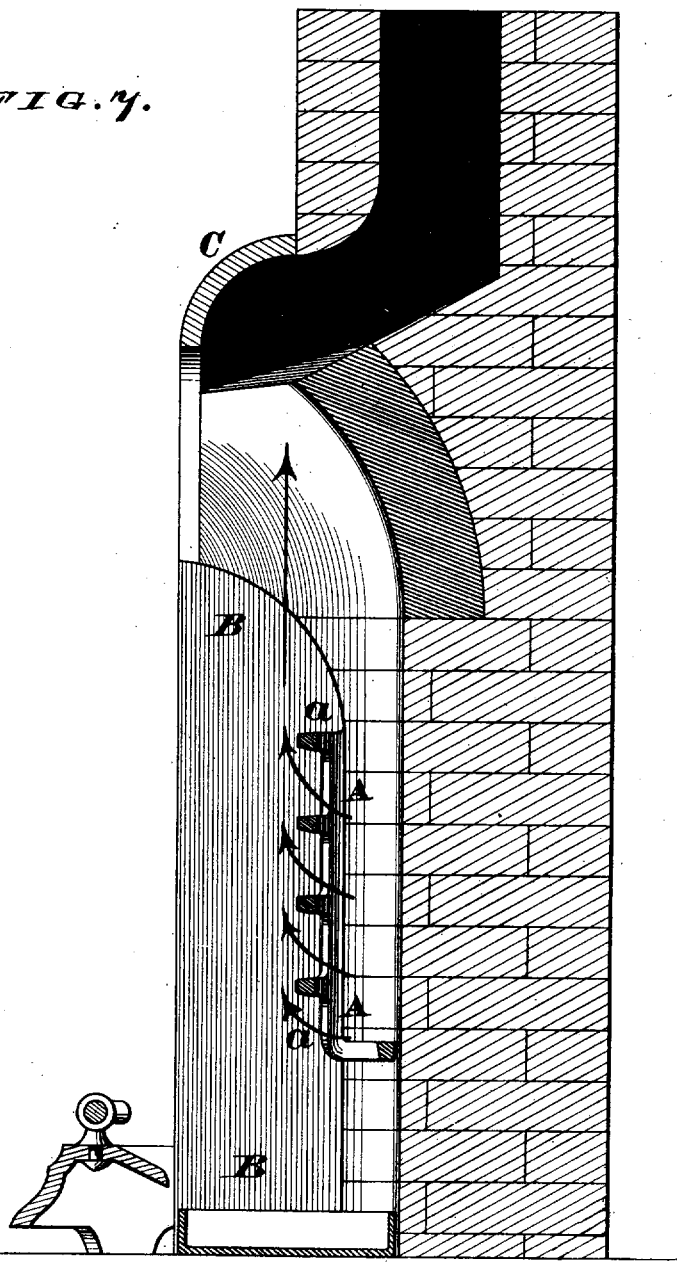

In the annexed drawings, making part of this specification, Figure 1 is a front elevation of my improved fire-place. Fig. 2 is a vertical section taken at the mid-length of the same. Fig. 3 is a horizontal section at the line X X. Figs. 4 and 5 are diagrams, showing modifications of my improvement. Fig. 6 is a transverse section of the fender-bar. Fig. 7 is an enlarged vertical section of the grate at the line Y Y.

The basket A or grate proper projects outwardly, or, in other words, is convex in front. It is flanked on both sides by jambs B B′, extending obliquely forward and sidewise to the vertical sides of the frame or front plate C.

Fig. 3 shows the basket A, jambs B B′, and frame C as cast in one piece. This is not essential to the invention. Fig. 4 shows the frame C made separate from the jambs, and Fig. 5 shows the basket made separate from the jambs. The construction last referred to leaves the basket A at liberty to be removed, when desired.

Hooks or lugs E, or staples or other devices may be employed for securing the separable basket A to the walls of the fire-place.

D is a fender-bar, covered with a vitreous enamel, *d*, which vitreous envelope prevents rust, and at the same time adds to the finished appearance of the bar.

The convex or projecting shape of the front of the basket A, and the oblique position of the jambs or walls B B′, which extend forward and outward from the sides of the said basket, form channels or passages *a a* in the rear of the most salient part of frame or front plate C. The said channels preferably equal in depth the whole convexity or projection of the front of the basket, and they communicate above with the main flue of the fire-place, causing smoke, gas, dust, &c., issuing from the sides of the basket to be conveyed into the chimney, as illustrated by the arrows in Fig. 7, instead of escaping into the room, as with fire-places of ordinary construction.

Another advantage incidental to the recessed channels *a a* is, that the fuel at the extremities of the basket is not exposed to cross-currents of air, and, consequently, an active combustion is maintained at the sides of the grate.

The oblique jambs B B′, in addition to the uses above recited, serve to reflect into the room the heat that radiates laterally from the grate-front. For this purpose the oblique jambs may be covered with polished plates, if desired.

The following are among the practical advantages in my invention:

I project the basket in the center, so that it holds sufficient fuel and can be set much easier in shallow places.

I recess the ends of the basket in connection with the jambs and back of the line of the summer front and frame, to carry up the light dust or smoke to the main flue.

I arrange the fire-place or grate as a whole for the purpose of holding the fuel well back of the throat or main flue, and under the top tile, dome, or crown, to reflect or throw out the heat before and in place of passing it directly up the main flue with the smoke.

I have the basket at all times in position ready for use, the summer front inclosing it needing simply to be removed when fire is wanted.

I make the jambs of durable material—metal, for example. They hold the basket back of the summer front and frame, or in the fire-hole proper, and prevent the enamel or finish being scorched or burned off the frame. The summer front incloses all and makes a finish.

Having thus described my invention, the following is what I claim as new therein, and desire to secure by Letters Patent:

1. The channels *a a*, formed at the junctions of a convex or forwardly-projecting grate, A, and jambs B B′, extending forward from the sides of the grate, the said channels communicating in a vertical direction with a forwardly-extending discharge-flue, substantially as and for the purposes herein set forth.

2. The combination of the projecting recessed grate or basket A, oblique jambs B B′, and front plate or frame C, substantially as and for the purposes set forth.

CHARLES S. RANKIN.

Witnesses:
OCTAVIUS KNIGHT,
CHAS. J. GOOCH.